US012765564B2

(12) United States Patent
Crosby et al.

(10) Patent No.: US 12,765,564 B2
(45) Date of Patent: Oct. 20, 2026

(54) PRE-SCORED FROZEN DOUGH SUB AND STEAK ROLLS

(71) Applicant: General Mills, Inc., Minneapolis, MN (US)

(72) Inventors: Christopher Crosby, Shakopee, MN (US); Ryan D. Gifford, Golden Valley, MN (US); Todd A. Rasmussen, Scandia, MN (US); Jeffrey David Reinke, Waconia, MN (US); Geoffrey P. Suski, Saint Paul Park, MN (US); Kara M. Hobart, New Hope, MN (US)

(73) Assignee: General Mills, Inc., Minneapolis, MN (US)

( * ) Notice: Subject to any disclaimer, the term of this patent is extended or adjusted under 35 U.S.C. 154(b) by 981 days.

(21) Appl. No.: 17/734,263

(22) Filed: May 2, 2022

(65) Prior Publication Data

US 2023/0345950 A1 Nov. 2, 2023

(51) Int. Cl.
*A21C 11/10* (2006.01)
*A21C 5/08* (2006.01)

(52) U.S. Cl.
CPC ................ *A21C 11/10* (2013.01); *A21C 5/08* (2013.01)

(58) Field of Classification Search
CPC ........... A21C 11/10; A21C 5/003; A21C 5/02; A21C 5/08
See application file for complete search history.

(56) References Cited

U.S. PATENT DOCUMENTS

| | | | |
|---|---|---|---|
| 255,972 | A | 4/1882 | Hahn |
| 337,329 | A | 3/1886 | Hewett |
| 825,775 | A | 7/1906 | Stumpf |

(Continued)

FOREIGN PATENT DOCUMENTS

| | | |
|---|---|---|
| CN | 107743993 | 3/2018 |
| DE | 827183 | 1/1952 |

(Continued)

OTHER PUBLICATIONS

Lematic, Inc. Modular Baking Systems, "*Random Dough Imprinter*", brochure, 2.

(Continued)

*Primary Examiner* — Alison L Hindenlang
*Assistant Examiner* — Alexander A Wang
(74) *Attorney, Agent, or Firm* — Jordan IP Law, LLC; Tina Yin Sowatzke, Esq.

(57) ABSTRACT

A plurality of dough pieces are produced using a rotary dough cutter comprises an annular cutter body configured to be rotatably driven, a plurality of arcuate sidewalls extending circumferentially about the cutter body, a plurality of radial divider walls extending across respective sidewalls, and a plurality of interior blades extending radially relative to the body between the sidewalls. The plurality of walls define a plurality of dough cutter molds. During conveying of a sheet of dough to the rotary dough cutter, the plurality of dough pieces are cut by the plurality of walls and scored with the plurality of interior blades. After being cut and scored, the dough pieces are removed from within the dough cutter molds with the assistance of a sequentially timed, regulated and adjustable fluid ejection system, and then frozen.

15 Claims, 6 Drawing Sheets

(56) References Cited

U.S. PATENT DOCUMENTS

| | | | |
|---|---|---|---|
| 1,295,024 | A | 2/1919 | Gosiewski |
| 1,357,665 | A | 11/1920 | Watkins |
| 1,558,206 | A | 10/1925 | Simpson |
| 1,728,702 | A | 9/1929 | Smith |
| 1,841,495 | A | 1/1932 | Mears |
| 1,871,755 | A | 8/1932 | Smith |
| 1,944,112 | A | 1/1934 | Schröder |
| 1,945,755 | A | 2/1934 | Scruggs, Jr. |
| 2,089,396 | A | 8/1937 | Meilstrup |
| 2,144,720 | A | 1/1939 | Gibson |
| 2,230,778 | A | 2/1941 | Flores |
| 2,246,424 | A | 6/1941 | Turner |
| 2,263,490 | A | 11/1941 | Fox |
| 2,346,839 | A | 4/1944 | Harriss et al. |
| 2,431,789 | A | 12/1947 | Cosgrove |
| 2,525,987 | A | 10/1950 | Williamson |
| 2,619,051 | A | 11/1952 | Rice |
| 2,681,625 | A | 6/1954 | Babbitt |
| 2,837,043 | A | 6/1958 | Grice et al. |
| 2,887,964 | A | 5/1959 | Griner |
| 2,999,314 | A | 9/1961 | Reichlein |
| 3,024,112 | A | 3/1962 | Burgess |
| 3,124,990 | A | 3/1964 | Anetsberger et al. |
| 3,128,724 | A | 4/1964 | Linder |
| 3,154,986 | A | 11/1964 | Reid |
| 3,225,718 | A | 12/1965 | Page |
| 3,279,927 | A | 10/1966 | Reid |
| 3,364,877 | A | 1/1968 | Zublena |
| 3,427,783 | A | 2/1969 | Reid |
| D213,574 | S | 3/1969 | Kuchuris et al. |
| 3,536,014 | A | 10/1970 | Kuchuris et al. |
| D219,300 | S | 11/1970 | Samarra |
| 3,595,111 | A | 7/1971 | Herschberger |
| 3,603,270 | A | 9/1971 | Tangel |
| 3,872,757 | A | 3/1975 | Hargadon |
| 3,880,030 | A | 4/1975 | Rosengren |
| 3,880,069 | A | 4/1975 | Moline |
| 3,911,805 | A | 10/1975 | Baird |
| 4,193,272 | A | 3/1980 | Bernard |
| 4,276,800 | A | 7/1981 | Koppa et al. |
| 4,352,831 | A | 10/1982 | Cavanagh et al. |
| 4,382,768 | A | 5/1983 | Lifshitz et al. |
| 4,469,476 | A | 9/1984 | Cavanagh et al. |
| 4,534,726 | A | 8/1985 | Simelunas |
| 4,543,053 | A | 9/1985 | Jasniewski |
| 4,578,027 | A | 3/1986 | Koppa et al. |
| 4,608,918 | A | 9/1986 | Funabashi et al. |
| 4,621,997 | A | 11/1986 | Cavanagh, Jr. et al. |
| 4,664,928 | A | 5/1987 | Mccaffrey |
| 4,671,759 | A | 6/1987 | Hayashi et al. |
| 4,789,555 | A | 12/1988 | Judd |
| 4,808,104 | A | 2/1989 | D'Orlando |
| 4,881,889 | A | 11/1989 | Spiel et al. |
| 5,162,119 | A | 11/1992 | Pappas et al. |
| 5,204,125 | A | 4/1993 | Larsen |
| 5,216,946 | A | 6/1993 | Huang et al. |
| 5,306,133 | A | 4/1994 | Dayley |
| 5,375,509 | A | 12/1994 | Taylor et al. |
| 5,388,489 | A | 2/1995 | Dayley |
| 5,402,715 | A | 4/1995 | Kurachi et al. |
| 5,529,799 | A | 6/1996 | Bornhorst et al. |
| 5,540,140 | A | 7/1996 | Rubio et al. |
| 5,552,101 | A | 9/1996 | Fujii et al. |
| 5,565,220 | A | 10/1996 | Rubio et al. |
| 5,576,033 | A | 11/1996 | Herrera |
| 5,601,012 | A | 2/1997 | Ellner |
| 5,622,742 | A | 4/1997 | Carollo |
| 5,641,527 | A | 6/1997 | Burger |
| 5,662,949 | A | 9/1997 | Rubio et al. |
| 5,667,834 | A | 9/1997 | Rubio et al. |
| 5,687,638 | A | 11/1997 | Makowecki |
| D391,125 | S | 2/1998 | Morales |
| 5,759,608 | A | 6/1998 | Momiyama |
| 5,871,783 | A | 2/1999 | Capodieci |
| 6,024,554 | A | 2/2000 | Lawrence |
| 6,055,897 | A | 5/2000 | Mysliwiec |
| 6,168,817 | B1 | 1/2001 | Pavan |
| 6,268,005 | B1 | 7/2001 | Brewer |
| 6,279,440 | B1 | 8/2001 | Truttmann et al. |
| 6,298,760 | B1 | 10/2001 | Truttmann et al. |
| 6,305,260 | B1 | 10/2001 | Truttmann et al. |
| 6,530,771 | B1 | 3/2003 | Clark |
| 6,555,152 | B1 | 4/2003 | Roso |
| 6,562,389 | B1 | 5/2003 | Yusufi |
| 6,851,192 | B2 | 2/2005 | So |
| 6,902,754 | B1 | 6/2005 | Evans et al. |
| 7,331,120 | B2 | 2/2008 | Scherb et al. |
| 7,421,947 | B2 | 9/2008 | Bryan |
| 7,771,182 | B2 | 8/2010 | Fornaguera |
| 7,828,543 | B2 | 11/2010 | Herrera |
| 7,914,834 | B2 | 3/2011 | Fu et al. |
| 8,622,729 | B2 | 1/2014 | Suski |
| D728,322 | S | 5/2015 | Suski et al. |
| 9,044,026 | B2 | 6/2015 | Bakhourn |
| 9,220,279 | B2 | 12/2015 | Suski |
| D840,191 | S | 2/2019 | Hosogane |
| 2006/0286244 | A1 | 12/2006 | Fu et al. |
| 2010/0159095 | A1 | 6/2010 | Suski et al. |
| 2010/0196564 | A1 | 8/2010 | Cepeda Mendoza et al. |
| 2010/0227024 | A1 | 9/2010 | Flores |
| 2014/0260847 | A1 | 9/2014 | Schneider |
| 2019/0307135 | A1* | 10/2019 | Gottenbusch .......... A21D 13/40 |
| 2019/0357549 | A1* | 11/2019 | Crosby .................. A21C 11/10 |
| 2023/0276995 | A1* | 9/2023 | Lyell ................... A47J 43/0722 83/13 |

FOREIGN PATENT DOCUMENTS

| | | |
|---|---|---|
| DE | 3332061 | 3/1985 |
| DE | 3410162 | 3/1985 |
| EP | 0130772 | 1/1985 |
| EP | 0841009 | 5/1998 |
| FR | 2195892 | 3/1974 |
| FR | 2643229 | 8/1990 |

OTHER PUBLICATIONS

Gemini Bakery Equipment Co., "*We're With You From Beginning to End*", brochure, 2.

Doge, Vajra Equipment & Consulting, Inc. "*Professional Machinery for Food Industry*", brochure, 4.

Rademaker B.V., "*Make Up Lines the Most Versatile Approach*", booklet, 26.

The Moline Company, A Division of Pillsbury Company, Moline Bulletin 529, "*Round Cutters*", p. 1, printed in USA at least prior to 1991.

* cited by examiner

PRE-SCORED FROZEN DOUGH SUB AND STEAK ROLLS

BACKGROUND OF THE INVENTION

The invention generally pertains to the art of food production and, more specifically, to the production of pre-scored, frozen bread products, particularly sub and steak rolls.

Bakery operators sometimes purchase partially finished food products that are then finished in the bakery before being sold to consumers. For example, bakery operators can purchase frozen bread dough, which they thaw, proof and bake prior to sale. Depending on the desired bread product, the bread dough may be scored after proofing and before baking. Generally, it is preferred that the amount of time and labor required to finish such partially finished food products is kept to a minimum. Accordingly, it would be desirable to provide bread dough products, such as frozen sub or steak rolls, which are effectively and efficiently manufactured with scores prior to being frozen and sent to bakery operators or grocery stores for purchase by consumers.

SUMMARY OF THE INVENTION

The invention achieves the above goal by providing a method and machinery configured to automatically score dough pieces during formation of the dough pieces from a dough sheet. Specifically, a rotary dough cutter comprises an annular cutter body configured to be rotatably driven, a plurality of arcuate sidewalls extending circumferentially about the cutter body, a plurality of radial divider walls extending across respective sidewalls, and a plurality of interior blades extending radially relative to the body between the sidewalls. The various walls define a plurality of dough cutter molds with, except for various walls of the outermost cutter molds located at terminal ends of the cutter body, each wall forming a common part of adjacent dough cutter molds. Each of the plurality of interior blades is located spaced from and between successive divider walls in a respective one of the plurality of dough cutter molds. With movement of the dough sheet and rotation of the rotary dough cutter, the dough pieces are cut from the dough sheet with the plurality of walls, and the dough pieces are scored with the plurality of interior blades. After being cut and scored, the dough pieces are removed from within the dough cutter molds with the assistance of a fluid ejection system, and then frozen. The fluid ejection system includes a plurality of outlets exposed to each dough cutter mold and a fluid supply system for directing and timing the injection of fluid, such as air, to the outlets in a specified set of dough cutter molds which have just completed cut and scoring operations. In addition, the fluid ejection system includes a flow distribution control assembly for selectively adjusting flow characteristics of the fluid to the various dough cutter molds to assure proper dough product ejection based on parameters of the dough, such as dough density and formulation.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, as used in connection with the present invention, terms such as "parallel" and "perpendicular" do not necessarily require, for example, that the relevant items be perfectly parallel. Instead, these terms include a margin of error of +/−5° (regardless of whether the error is by design or due to inherent manufacturing limitations) so long as the error does not prevent the present invention from functioning as intended.

Figure 1:
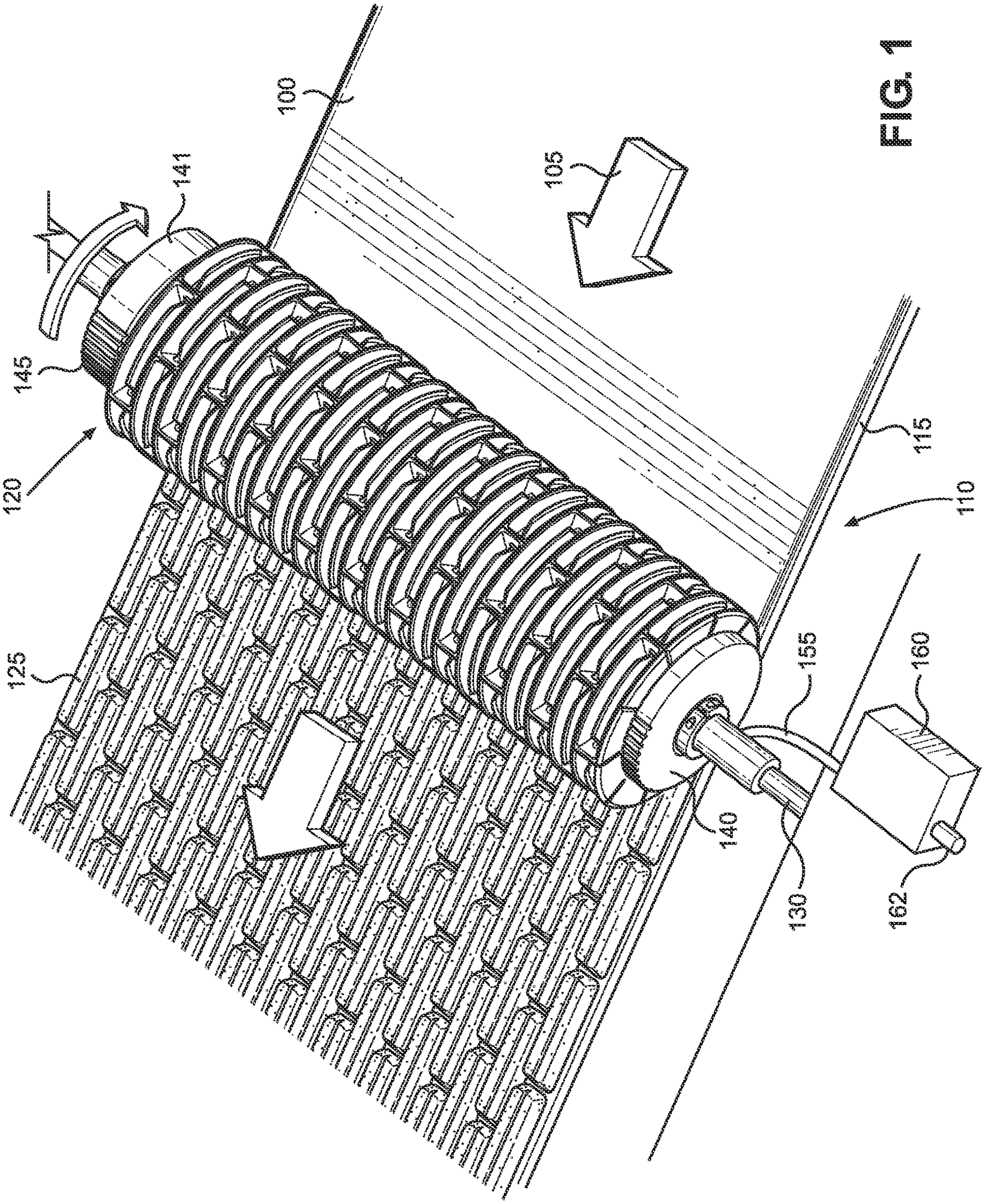
FIG. 1 is a perspective view of a portion of a production line for producing dough pieces in accordance with the invention.

With initial reference to FIG. 1, there is shown a portion of a production line for producing dough pieces in accordance with the present invention. Specifically, FIG. 1 shows a dough sheet 100 being transported in a direction 105 by a conveyor system 110. In the embodiment illustrated, conveyor system 110 includes a conveyor belt 115 on which dough sheet 100 is supported. However, other conveyor systems known in the art can be used with the present invention. Although not shown, it should be understood that the dough of dough sheet 100 is formed in a batch maker or the like and then processed into dough sheet 100.

Dough sheet 100 passes beneath a rotary dough cutter 120, which is configured to repeatedly cut dough pieces, such as in a form needed to make sub or steak rolls, from dough sheet 100 as dough sheet 100 is transported in direction 105. For example, FIG. 1 shows a plurality of dough pieces 125. Rotary dough cutter 120 is supported above dough sheet 100 on a longitudinally extending driveshaft 130, with rotary dough cutter 120 and driveshaft 130 being aligned perpendicular to direction 105. Rotary dough cutter 120 is configured such that contact between rotary dough cutter 120 and dough sheet 100 or conveyor belt 115 causes rotary dough cutter 120 to rotate in a direction 135 as dough sheet 100 and conveyor belt 115 travel in direction 105. Alternatively, a motor and transmission (not shown) can be provided for driving rotary dough cutter 120 to rotate in direction 135.

Adjustable side plates 140 and 141 are located at opposite ends of rotary dough cutter 120. In the embodiment shown, each side plate 140, 141 is provided with a plurality of circumferentially spaced indicia, such as in the form of notches, generally indicated at 145 for plate 141. The purpose and function of side plates 140 and 141 will be discussed further below. However, at this point, it should simply be noted that shaft 130 and rotary dough cutter 120 are configured to rotate relative to side plates 140 and 141. Also shown in this figure is a fluid supply hose 155 leading to side plate 140 from a pressure regulating controller 160 which receives fluid from a source, preferably a pneumatic source such as in the form of an air compressor (not shown) through a hose 162. Overall, the source, hose 162, pressure regulating controller 160 and fluid supply hose 155 collectively combine to define a fluid supply system as will be detailed further below with reference to air being the supplied fluid although other fluids, preferably in a gaseous state, could be employed. In a preferred embodiment of the invention, a corresponding fluid supply system is associated with side plate 141. In general, air under pressure enters rotary dough cutter 120 through side plates 140 and 141 and is timely distributed throughout rotary dough cutter 120 for use in ejecting dough pieces 125 from rotary dough cutter 120 after formation of dough pieces 125 from dough sheet 100, as explained further below.

Figure 2:
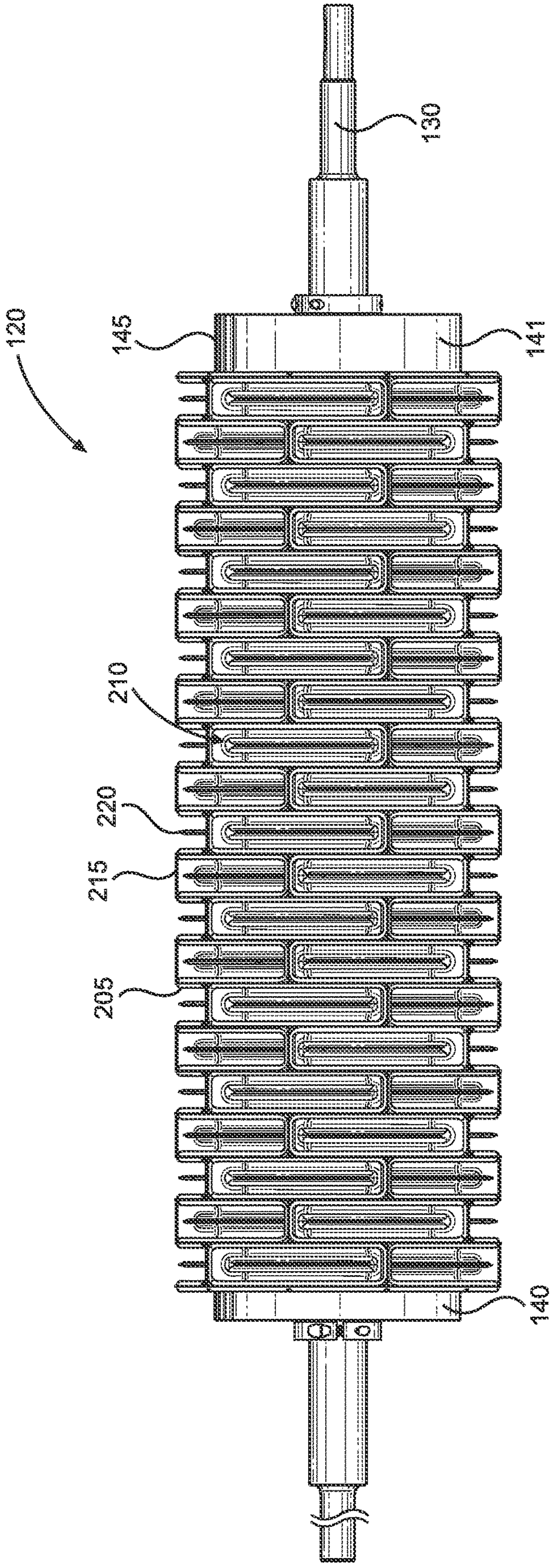
FIG. 2 is a top view of a rotary dough cutter constructed in accordance with the invention.
Figure 3:
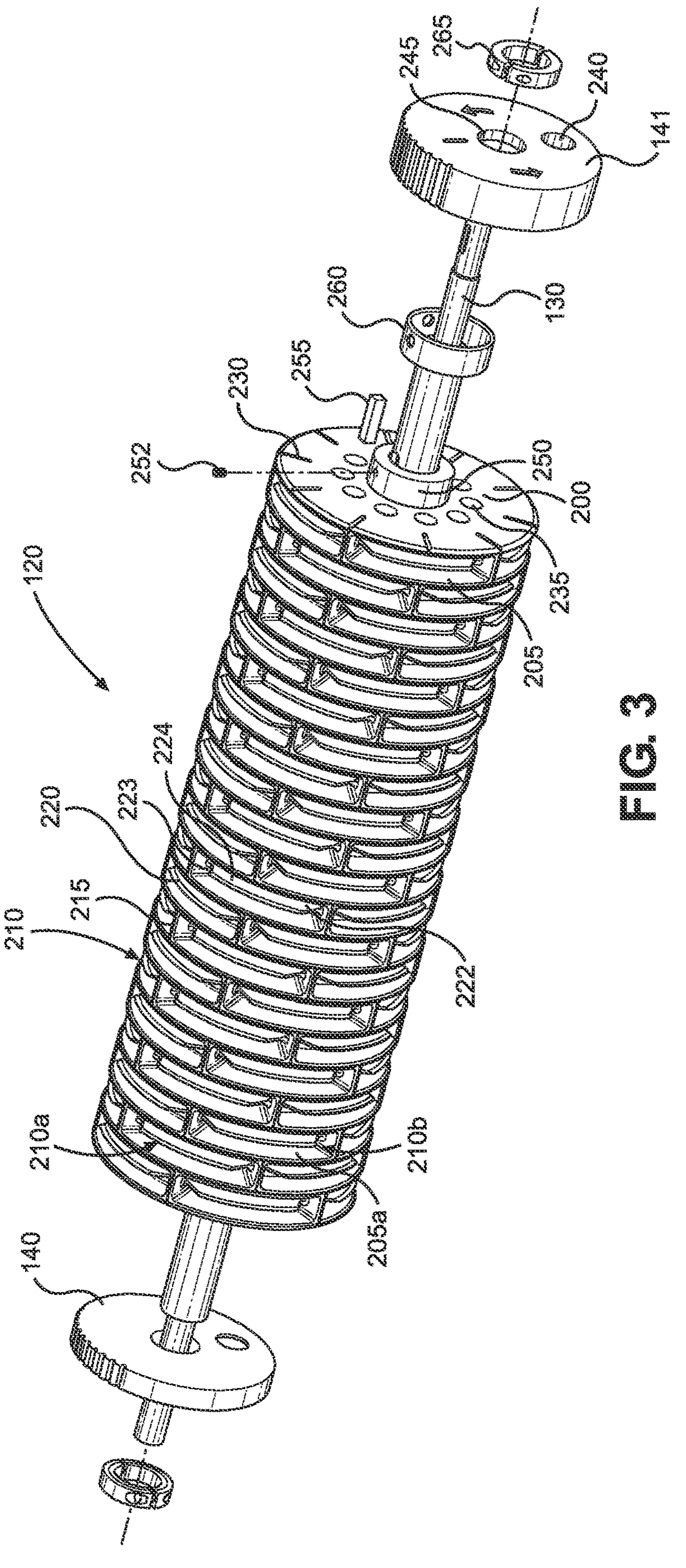
FIG. 3 is an exploded view of the rotary dough cutter of FIG. 2.

FIGS. 2 and 3 show rotary dough cutter 120 separate from dough sheet 100 and conveyor system 110 but with driveshaft 130 and side plates 140 and 141 still present. Rotary dough cutter 120 includes a main body 200, such as in the form of a substantially cylindrical sleeve as referenced hereinafter. A plurality of arcuate walls 205 extends radially outward from sleeve 200. Walls 205 define a plurality of dough cutter molds 210. In other words, walls 205 can be considered to be the exterior walls or sidewalls of dough cutter molds 210. Because there is no negative space provided between the dough cutter molds 210, each wall 205, except for walls 205 of the outermost cutter molds 210 located at terminal ends (not separately labeled) of the rotary dough cutter 120, forms a common part of adjacent dough cutter molds 210. For example, a wall 205*a* defines part of two different dough cutter molds 210*a* and 210*b*. Actually, given the offset nature of longitudinally spaced cutter molds 210, wall 205*a* actually forms one full side wall and two half side walls as clearly shown in these figures.

In addition to walls 205, each dough cutter mold 210 is further defined by a pair of circumferentially spaced, radial divider walls, one of which is labeled 215. More specifically, each divider wall 215 directly interconnects two longitudinally adjacent walls 205 such that an outer periphery of each dough cutter mold 210 is defined by a pair of spaced, parallel walls 205 which are interconnected by a pair of spaced divider walls 215. Walls 205 and 215 act as blades and are configured to cut dough pieces 125 from dough sheet 100, with one dough piece 125 being received in and shaped by each dough cutter mold 210. This cutting action can be performed in various ways, including using sharp blades, blunt edge cutters, perforation forming cutters or the like. Accordingly, in operation, walls 205 and 215 extend all the way through dough sheet 100 and engage conveyor belt 115. Due the structure of dough cutter mold 210 and particularly the configuration of walls 205 and 215, the only dough from dough sheet 100 that could be considered "wasted" during formation of dough pieces 125, i.e., the amount of dough sheet 100 that does not end up as one of dough pieces 125, is outside the terminal ends of sleeve 200 (and perhaps adjacent the corners of molds 210 if rounded). This minimization is accomplished by covering sleeve 200 with dough cutter molds 210 which exhibit a repeated use of a common shape, with minimal, if any, gaps.

Dough cutter molds 210 also include a plurality of interior blades 220 extending radially outward from sleeve 200. Each interior blade 220 is located within a respective dough cutter mold 210 at a position spaced from each of the walls 205 and 215 defining the particular dough cutter mold 210. More specifically, each interior blade 220 includes angled end portions 222 and 223 radially leading from sleeve 200 to an elongated central portion 224 which is radially recessed relative to walls 205. In accordance with a preferred embodiment of the invention, each end portion 222, 223 terminates directly adjacent a respective divider wall 215 so as to be cantilevered from sleeve 200, preferably bifurcating a respective dough cutter mold 210. Interior blades 220 are configured to score dough pieces 125 as dough pieces 125 are formed. Although interior blades 220 could be sharp so as to cut into but not all the way through dough sheet 100, in preferred embodiments, interior blades 220 are dull and score dough pieces 125 by only pushing down and deforming the dough, thereby altering the gluten matrix of the dough and weaking the dough piece 125 along the score. While only one interior blade 220 is shown in each dough cutter mold 210, it should be understood that dough cutter molds 210 can include multiple interior blades 220 if desired.

With particular reference to FIG. 3, the end faces (not separately labeled) of sleeve 200 are shown provided with markings 230 which, in the embodiment shown, are aligned with a respective series of divider walls 215. In addition, each end face is provided with a series of spaced openings, one of which is labeled at 235, with each opening 235 leading to a passage within sleeve 200 as will be detailed further below. Each of side plates 140 and 141 includes a through hole 240 which is offset from a central opening 245 used in mounting side plate 140, 141 upon shaft 130. Sleeve 200 is mounted for co-rotation with shaft 130 with opposing collars 250, each being configured to receive a set screw 252 and a key 255, which extends parallel to and interconnects driveshaft 130, a respective collar 250 and sleeve 200 (see also FIG. 4). On the other hand, each side plate 140, 141 does not co-rotate with driveshaft 130 but rather is supported on driveshaft 130, such as through a bearing mount 260, and retained in a desired position by a collar 265. As will be detailed more fully below, each side plate 140, 141 can be rotatably adjusted relative to a respective face plate of rotary dough cutter 120 and forms part of a flow distribution control assembly. To this end, through hole 240 is adapted to be in fluid communication with air supply hose 155.

Figure 4:
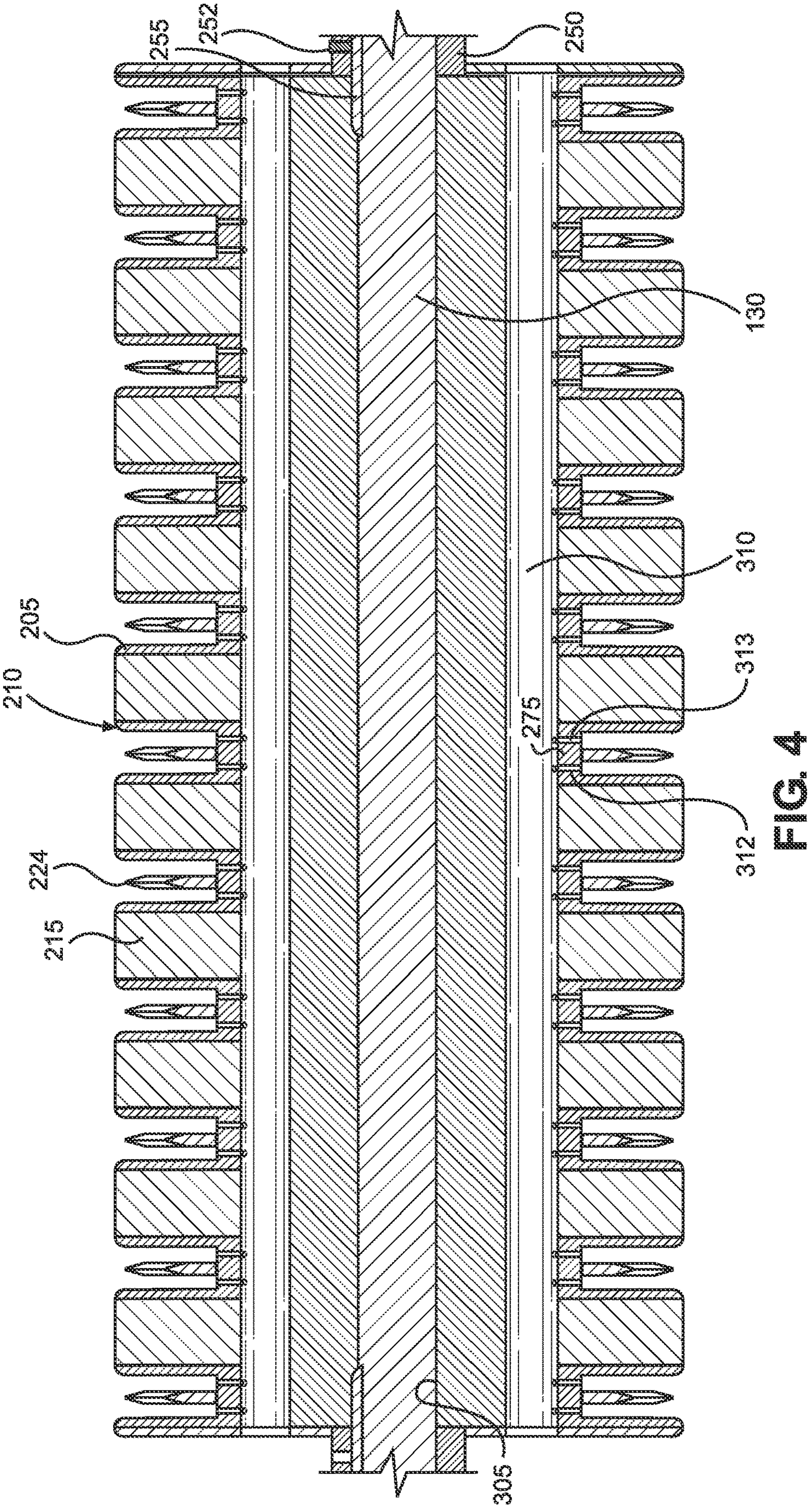
FIG. 4 is a cross-sectional of the rotary dough cutter.

FIG. 4 is a cross-section of rotary dough cutter 120 taken a longitudinal centerline of FIG. 2, without the inclusion of side plates 140 and 141, bearing mounts 260, collars 265 or end portions of shaft 130. Initially it should be noted how this view highlights the manner in which walls 205 and interior blades 220 extend radially outward from sleeve 200, with walls 205 extending radially farther than interior blades 220, e.g., about ¼" to ⅜" more. In addition, this figure depicts each mold 21 including a base 275, while a central bore 305 extending longitudinally through sleeve 200. Driveshaft 130 extends through central bore 305 to mount rotary dough cutter 120 to driveshaft 130. Furthermore, depicted is rotary dough cutter 120 including a plurality of air passages 310 extending longitudinally through shaft 200 and terminating in a respective one of openings 235 at each end of sleeve 200. A plurality of air outlets (shown arranged as pairs of outlets 312 and 313 which form part of an overall fluid ejection system) are open to a respective air passage 310, extend radially from air passage 310 through a respective base 275 and into a dough cutter mold 210 on either side of an interior blade 220. Passages 310 receive fluid (again preferably air) from supply hose 155, with the air then being injected through outlets 315 to dough cutter molds 210. As stated above, fluid pressure is used to help discharge dough pieces 125 from dough cutter molds 210. Passages 310, which are part of the fluid supply system and, correspondingly, the overall fluid ejection system, receive the pressurized fluid selectively based on the periodic alignment of openings 240, fully or partially, with one or more openings 235 leading to respective passages 310 during rotation of sleeve 200 relative to side plates 140 and 141. Preferably, the air supply is controlled to be supplied in strategically timed pulses from each longitudinal side of sleeve 200, with the air flow meeting in the middle regions of sleeve 200 in essentially simultaneously supplying air to an aligned set of dough cutter molds 210. Given the successive alignment of openings and the timed pulsing of pressurized air, dough pieces 125 are discharged only from the desired dough cutter molds 210 at a precise moment of the continuous production process. Therefore, a specified series of axially aligned dough cutter molds 210 are supplied with air through air passages 310 based on the rotational position of rotary dough cutter 120 relative to side plates 140 and 141, thereby providing for the timely ejection of dough pieces 125. As only the openings 240 provided in side plates 240 and 241 are directly supplied with the air, the amount of air supplied at a given moment in the process to each opening 235 and corresponding passage 310 can be varied by adjusting an alignment position of the side plates 240 and 241. Therefore, presence of side plates 240 and 241 provide a flow distribution control assembly for selectively adjusting flow and timing characteristics of the fluid to the sets of dough cutter molds 210, with any adjustment being aided in accordance with the invention due to the inclusion of indicia 145 and/or markings 230.

Figure 5:
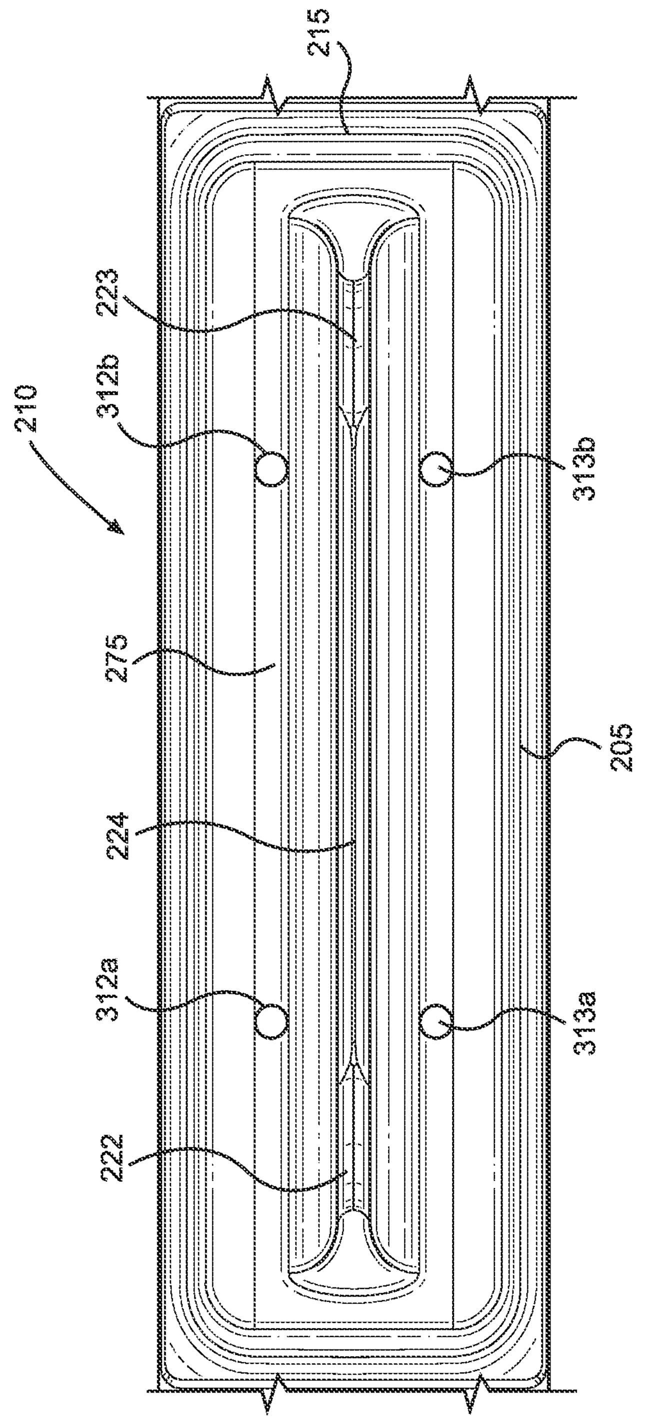
FIG. 5 is an enlarged view of a dough cutter mold of the rotary dough cutter.

The enlarged mold view of FIG. 5 further illustrates how walls 205 and 215, as well as base 275, define an interior region of a dough cutter mold 210. In operation, rotation of rotary dough cutter 120 results in this interior region being filled with dough to create a dough pieces 125, with walls 205 and 215 cutting dough piece 125 from dough sheet 100 and shaping dough piece 125, with one preferred manner having the outermost edges (not separately labeled) of walls 205 and 215 being radiused to establish blunt edge cutters which function to cut by pulling an upper skin of the dough down to a lower skin and pinching the skins, thereby creating rounded sides for each dough piece 125. At the same time, interior blade 220 within region 400 scores the dough piece 125. After some additional rotation of rotary dough cutter 120, the dough piece 125 located in interior region 400 is discharged from interior region 400 by forcing air first through a first set of air outlets 312*a* and 312*b* at a leading end portion of mold 210, then a second set of outlets 312*b* and 312*b* at a trailing end portion. For this purpose, although four such air outlets are shown for each dough cutter mold 210, the actual number, size and location of the air outlets can vary, particularly depending on factors such as the size of the air outlets, the composition of dough sheet 100, the supply pressure of the incoming air, and the like. Eventually, further rotation of rotary dough cutter 120 results in another series of dough pieces 125 being received in respective interior regions 400 and simultaneously discharged. This cycle repeats continuously so long as dough sheet 100 is present and rotary dough cutter 120 is rotating.

After formation of cut and scored dough pieces 125, the dough pieces 125 are preferably frozen, most preferably in an un-proofed state. At this point, it should be noted that "un-proofed" in accordance with the invention means that no substantial or intentional actions are taken to promote proofing. Rather, the dough pieces are, at the very least, frozen shortly after being formed so as to save proofing for later. Thereafter frozen, un-proofed dough piece can be transported to a bakery operator, for example, who thaws, proofs, bakes and sells the resulting bread product. Of course, the dough pieces, frozen or otherwise, could be sold through other avenues, such as delivery to a grocery store for sale directly to a consumer who cooks the dough piece to create the bread product.

Figure 6:
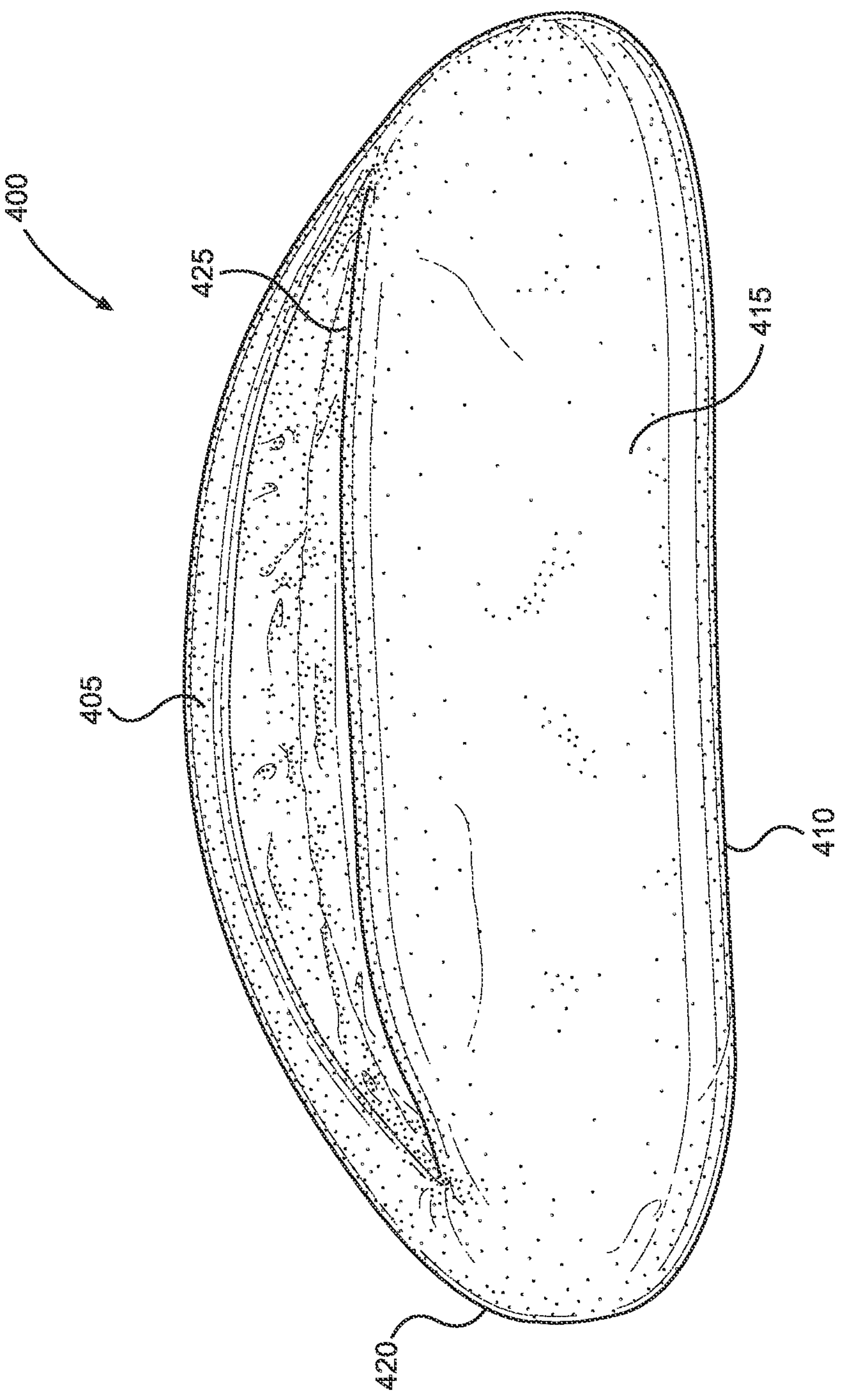
FIG. 6 is a perspective view of a dough product produced using the rotary dough cutter.

As previously indicated, the invention is mainly concerned with the continuous production of sub or steak rolls. FIG. 6 shows such a bread product. Specifically, FIG. 6 shows a bread product 400, which corresponds to dough piece 125 after baking. As such, bread product 400 has an upper surface 405, lower surface 410, side surfaces 415 and end surfaces 420. In the central portion of bread product 400, the score created as described above has opened up, forming an elongated opening 425. This occurs during baking of dough piece 400 as dough piece 400 expands and breaks due to the weakening of the dough matrix during scoring. Again, in accordance with the invention, dough product 400 is in the form of a sub or steak roll. However, it should be recognized that other bread products can certainly be produced in accordance with the present invention.

Based on the above, it should be readily apparent that the present invention provides dough products that are continuously cut, scored and forcibly ejected from molds prior to being proofed and frozen (i.e., before being purchased by bakery operators), as well as an apparatus and method for producing the dough products. While certain preferred embodiments of the present invention have been set forth, it should be understood that various changes or modifications could be made without departing from the spirit of the present invention. In general, the invention is only intended to be limited by the scope of the following claims.

The invention claimed is:

1. A method of continuously producing a plurality of dough pieces using a rotary dough cutter assembly comprising a rotary dough cutter including a main body and a plurality of dough cutter molds provided about the main body, with each dough cutter mold being defined by a respective pair of spaced, substantially parallel side walls extending circumferentially about the main body, multiple spaced divider walls interconnecting the pair of the side walls at circumferentially spaced locations so as to establish multiple ones of the dough cutter molds between pairs of the adjacent said side walls, and an interior blade extending radially between the pair of side walls and circumferentially successive ones of said divider walls wherein the side walls and divider walls of each dough cutter mold are adapted to cut a piece of dough while the interior blade scores the piece of dough, with a score configured to form an opening during baking of the dough piece, the method comprising:

conveying a dough sheet under the rotary dough cutter while rotating the rotary dough cutter to cut the plurality of dough pieces from the dough sheet with the plurality of walls and scoring the plurality of dough pieces with the plurality of interior blades; and sequentially injecting fluid into select sets of the dough cutter molds to eject the plurality of dough pieces from the dough cutter molds with a fluid ejection system including a plurality of passages in the main body leading to outlets exposed to each dough cutter mold, a fluid supply system configured to develop and direct pressurized fluid for injection through the outlets in the sets of dough cutter molds and a flow distribution control assembly, including at least one side plate positioned adjacent the main body and including an opening configured to align with successive ones of the plurality of passages as the rotary dough cutter rotates, configured to selectively control and adjust flow and timing characteristics of the fluid to only a subset of dough cutter molds in a timed manner, and configured to vary an amount of flow supplied at any given moment by adjusting an alignment between the fluid supply system and the plurality of passages, wherein the at least one side plate is configured to rotate relative to the main body to control and adjust flow of the fluid.

2. The method of claim 1, wherein the fluid is sequentially injected at leading portions within the sets of dough cutter molds followed by trailing portion within the sets of dough cutter molds.

3. The method of claim 2, wherein each dough cutter mold is exposed to at least first and second sets of outlets, with the fluid being sequentially supplied to the first set of outlets followed by the second set of outlets.

4. The method of claim 3, wherein each of the first set of outlets and the second set of outlets includes at least one outlet on opposite sides of a respective one of the interior blades.

5. The method of claim 1, wherein the fluid is injected from opposing end portions of the rotary dough cutter into the plurality of passages.

6. The method of claim 1, wherein the fluid is supplied in a pulsing manner.

7. The method of claim 1, further comprising adjusting the flow distribution control assembly by adjusting an alignment between the fluid supply system and the plurality of passages.

8. The method of claim 7, wherein adjusting the alignment includes rotating the at least one side plate relative to the rotary dough cutter.

9. The method of claim 8, further comprising utilizing at least one of markings on the main body and indicia on the at least one side plate to indicate an established setting for the flow distribution control assembly.

10. A rotary dough cutter assembly comprising:

a rotary dough cutter including:

a main body; and a plurality of dough cutter molds provided about the main body, with each dough cutter mold being defined by:

a pair of spaced, substantially parallel side walls extending circumferentially about the main body; multiple spaced divider walls interconnecting the pair of the side walls at circumferentially spaced locations so as to establish multiple ones of the dough cutter molds between pairs of the adjacent said side walls; and an interior blade extending radial between the pair of side walls and circumferentially successive ones of said divider walls, wherein the side walls and divider walls of each dough cutter mold are adapted to cut a piece of dough while the interior blade scores the piece of dough with a score configured to form an opening during baking of the dough piece, and a fluid ejection system including a plurality of passages in the main body leading to outlets exposed to each dough cutter mold, a fluid supply system configured to develop and direct pressurized fluid for injection through the outlets in the dough cutter molds, and a flow distribution control assembly including at least one side plate positioned adjacent the main body and including an opening configured to align with successive ones of the plurality of passages as the rotary dough cutter rotates, configured to selectively control and adjust flow of the fluid to only a subset of the dough cutter molds in a timed manner, and configured to vary an amount of flow supplied at any given moment by adjusting an alignment between the fluid supply system and the plurality of passages, wherein the at least one side plate is configured to rotate relative to the main body to control and adjust flow of the fluid.

11. The rotary dough cutter assembly of claim 10, further comprising at least one of markings on the main body and indicia on the at least one side plate to indicate an established setting for the flow distribution control assembly.

12. The rotary dough cutter assembly of claim 10, wherein the outlets are arranged in pairs, arranged on opposing sides of the interior blade for each of the dough cutter molds.

13. The rotary dough cutter assembly of claim 12, further comprising multiple sets of the pairs of outlets respectively arranged at leading and trailing portions within each dough cutter mold.

14. The rotary dough cutter assembly of claim 10, wherein the fluid is injected from opposing end portions of the main body of the rotary dough cutter into the plurality of passages.

15. The rotary dough cutter assembly of claim 10, wherein the fluid supply system is configured to supply the fluid in a pulsing manner.

* * * * *